(12) United States Patent
Sumida et al.

(10) Patent No.: US 7,217,585 B1
(45) Date of Patent: May 15, 2007

(54) METHOD FOR FABRICATING AND USING A LIGHT WAVEGUIDE

(75) Inventors: David S. Sumida, Los Angeles, CA (US); Authi A. Narayanan, Thousand Oaks, CA (US); Hans W. Bruesselbach, Calabasas, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/395,702

(22) Filed: Mar. 31, 2006

(51) Int. Cl.
*H01L 21/20* (2006.01)

(52) U.S. Cl. ..................... 438/31; 438/455
(58) Field of Classification Search ............. 438/31, 438/479, 455–459, 795–799
See application file for complete search history.

(56) References Cited

U.S. PATENT DOCUMENTS

| | | | |
|---|---|---|---|
| 5,113,472 A | | 5/1992 | Gualtieri et al. |
| 5,175,787 A | | 12/1992 | Gualtieri et al. |
| 5,245,689 A | * | 9/1993 | Gualtieri ............... 385/142 |
| 5,441,803 A | | 8/1995 | Meissner |
| 5,502,737 A | * | 3/1996 | Chartier et al. ........... 372/11 |
| 5,563,979 A | | 10/1996 | Bruce et al. |
| 5,846,638 A | | 12/1998 | Meissner |
| 6,025,060 A | * | 2/2000 | Meissner .................. 428/220 |
| 6,090,636 A | * | 7/2000 | Geusic et al. ............... 438/31 |
| 6,160,824 A | * | 12/2000 | Meissner .................. 372/7 |
| 6,511,571 B2 | | 1/2003 | McCallion et al. |
| 6,593,212 B1 | * | 7/2003 | Kub et al. ................. 438/458 |

OTHER PUBLICATIONS

Ichiro Shoji et al., "Intrinsic reduction of the depolarization loss in solid-state lasers by use of the (110)-cut $Y_3Al_5O_{12}$ crystal", *Applied Physics Letters*, vol. 80, No. 17, pp. 3048-3050.
Manuel Jimenez-Melando et al., "Ytterbium Cation Diffusion in Yttrium Aluminum Garnet (YAG)-Implications for Creep Mechanisms", *J. Am. Ceram. Soc.*, vol. 84(10), pp. 2356-2360.

* cited by examiner

*Primary Examiner*—Savitri Mulpuri
(74) *Attorney, Agent, or Firm*—Leonard A. Alkov

(57) ABSTRACT

A waveguide is fabricated by first preparing two waveguide precursor pieces. Each waveguide precursor piece includes a single-crystal substrate, and an epitaxial coating layer of an oxide coating material on the substrate. The oxide substrate material preferably comprises yttrium as a substrate-material cation, and the oxide coating material preferably comprises a coating-material cation selected from the group consisting of ytterbium, thulium, erbium, and holmium. The two substrates are placed together with the coating layers in contact to form a precursor structure. The precursor structure is heated to an elevated diffusion temperature so that the coating layers bond together and the coating materials and the respective substrate materials interdiffuse to form the waveguide having an interdiffused region. A laser beam may be directed through the interdiffused region, while the interdiffused region is optionally optically pumped through one or both of the substrates.

10 Claims, 3 Drawing Sheets

METHOD FOR FABRICATING AND USING A LIGHT WAVEGUIDE

This invention relates to a light waveguide and, more particularly, to a planar light waveguide that may be prepared in a large lateral size with a highly precise core thickness and compositional profile.

BACKGROUND OF THE INVENTION

A light waveguide is a solid body that transmits light such as a laser beam therethrough while confining the light beam to a specific region of the solid body. An optical fiber is an example of a light waveguide, wherein the light is confined to a long, narrow channel. In other applications, a planar light waveguide is required, wherein the light beam is confined to a planar region within the waveguide.

A planar light waveguide is normally fabricated by bonding a sheet of a core material to a piece of a first outer layer. The surfaces that are bonded together must be of optical quality. The core is next precisely thinned to a desired thickness dimension, typically in the tens-of-micrometers-thickness range. This bonding-and-thinning approach is required because the core cannot be initially furnished in the very thin dimension required prior to bonding to the first outer layer. During the thinning, the thinned surface must be maintained perfectly parallel to the side of the core bonded to the first outer layer, and the exposed surface of the core must have an optical-quality finish at completion. A second outer layer having a surface with an optical-quality finish is then bonded to the opposite side of the thinned-core from the first outer layer to complete the structure. Light is transmitted through the core in the final structure, which serves as a waveguide.

This conventional approach is difficult and expensive to implement. Contamination of the components is a concern during the multiple thinning, polishing, and bonding steps. The requirements for the several optical-quality surfaces and the precise, parallel thinning of the core to a small thickness dimension are difficult to accomplish in any event. They are prohibitive where the lateral extent of the core is tens of centimeters in either planar dimension. Current technology used with this fabrication procedure simply cannot fabricate such a structure with dimensional tolerances of the core on the order of a few micrometers, to produce a core on the order of a few tens of micrometers thick with the required degree of parallelism, over such large areas.

There is a need for an improved approach to fabricating planar waveguides that have the required core thickness and tolerances, particularly in large lateral sizes. The present invention fulfills this need, and further provides related advantages.

SUMMARY OF THE INVENTION

The present approach provides a method for fabricating and using a planar waveguide. A waveguide of small, precise thickness and with precisely parallel interior waveguide surfaces is prepared with only a single bonding operation. The multiple thinning, polishing, and bonding operations of the prior approach are not used. The planar waveguide may be fabricated to have either a stepwise or a graded index of refraction between the cladding and the core. The present approach may be used to make waveguides with a large lateral extent, of 10 centimeters or more.

In accordance with the invention, a method for fabricating and using a waveguide includes preparing two waveguide precursor pieces. Each waveguide precursor piece comprises a single-crystal substrate made of an oxide substrate material and having a coating face with a substrate crystallographic direction lying in the coating face, and an epitaxial coating layer of an oxide coating material on the coating face of the substrate. The oxide substrate material and the oxide coating material are different materials. In a preferred embodiment, the oxide substrate material comprises yttrium as a substrate-material cation and the oxide coating material comprises a coating-material cation selected from the group consisting of ytterbium, thulium, erbium, and holmium. The two substrates are placed together with their coating layers in contact and with their substrate crystallographic directions parallel, to form a precursor structure. The precursor structure is heated to an elevated temperature, so that the coating layers bond together, and the coating materials and the substrate materials interdiffuse to form the waveguide having an interdiffused region. Optionally, a pressure may be applied perpendicular to the coating faces of the substrates during the heating. The waveguide is thereafter cooled to room temperature.

The substrate is desirably a cubic single-crystal with a (111) coating face and a <110> substrate crystallographic direction. The epitaxial coating layer preferably has a thickness of from about 1 nanometer to about 100 micrometer, more preferably from about 5 to about 10 micrometers, and most preferably about 10 micrometers.

The oxide coating material may optionally be doped with a dopant cation therein that is different from and is in addition to the coating-material cation. An example of such a dopant cation is gallium, which may be added to increase the index of refraction.

When the waveguide is used, a light beam (the signal beam), such as a laser beam, is directed through the interdiffused region of the waveguide but not through the substrates of the waveguide. The interdiffused region must therefore be transparent to the wavelength of the light beam. The interdiffused region thereby serves as the core of the waveguide, and the substrates are the bounding or cladding material on either side of the core. In an application most interest, optical-pumping energy is applied to the interdiffused region of the waveguide through at least one of the substrates of the waveguide, so that the waveguide acts as a gain medium. The substrate(s) through which the optical-pumping energy is introduced must be transparent to the wavelength of the optical-pumping energy.

In another embodiment, a method for fabricating and using a waveguide includes preparing two waveguide precursor pieces. Each waveguide precursor piece comprises a single-crystal substrate made of an oxide substrate material having a coating face with a substrate crystallographic direction lying in the coating face, and an epitaxial coating layer of an oxide coating material on the coating face of the substrate. The oxide substrate material and the oxide coating material are different materials. The oxide substrate material comprises a substrate-material cation and the oxide coating material comprises a coating-material cation. An ionic radius of the substrate-material cation and an ionic radius of the coating-material cation are sufficiently close, typically within about 5 percent of each other, that the substrate and the epitaxial coating layer have the same crystal structure. The two substrates are placed together with their coating layers in contact and with their substrate crystallographic directions parallel, to form a precursor structure. The precursor structure is heated to an elevated diffusion temperature, so that the coating materials and the respective substrate materials interdiffuse and the coating layers bond together to form the waveguide having an interdiffused region. The waveguide is thereafter cooled to room temperature. Other compatible features of the present approach may be used with this embodiment.

The planar waveguide has a stepwise index of refraction between the coating-material core and the substrate cladding, if there is little interdiffusion. If there is a greater amount of interdiffusion, there is a graded index of refraction between the coating-material core and the substrate cladding. The core with the graded index of refraction has the advantage that it discriminates against higher-order light-propagation modes better than does a stepwise index of refraction. Consequently, lower-order propagation modes are supported with less competition from higher order modes. The result is better beam quality of the signal light beam transmitted through the coating-material core.

The present approach provides a technique for fabricating a planar light waveguide that has a core region produced by an epitaxial coating layer, with the substrate cladding on either side of it. The core region has a precise thickness to within tight tolerances. The surfaces bounding the core region are parallel and of optical quality as a result of the diffusional manner in which they are produced. The present approach is suitable for making waveguides wherein the core region extends over many centimeters (typically at least about 10 centimeters) in either dimension lying in the surface. Such large waveguides cannot be practically fabricated by other techniques.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
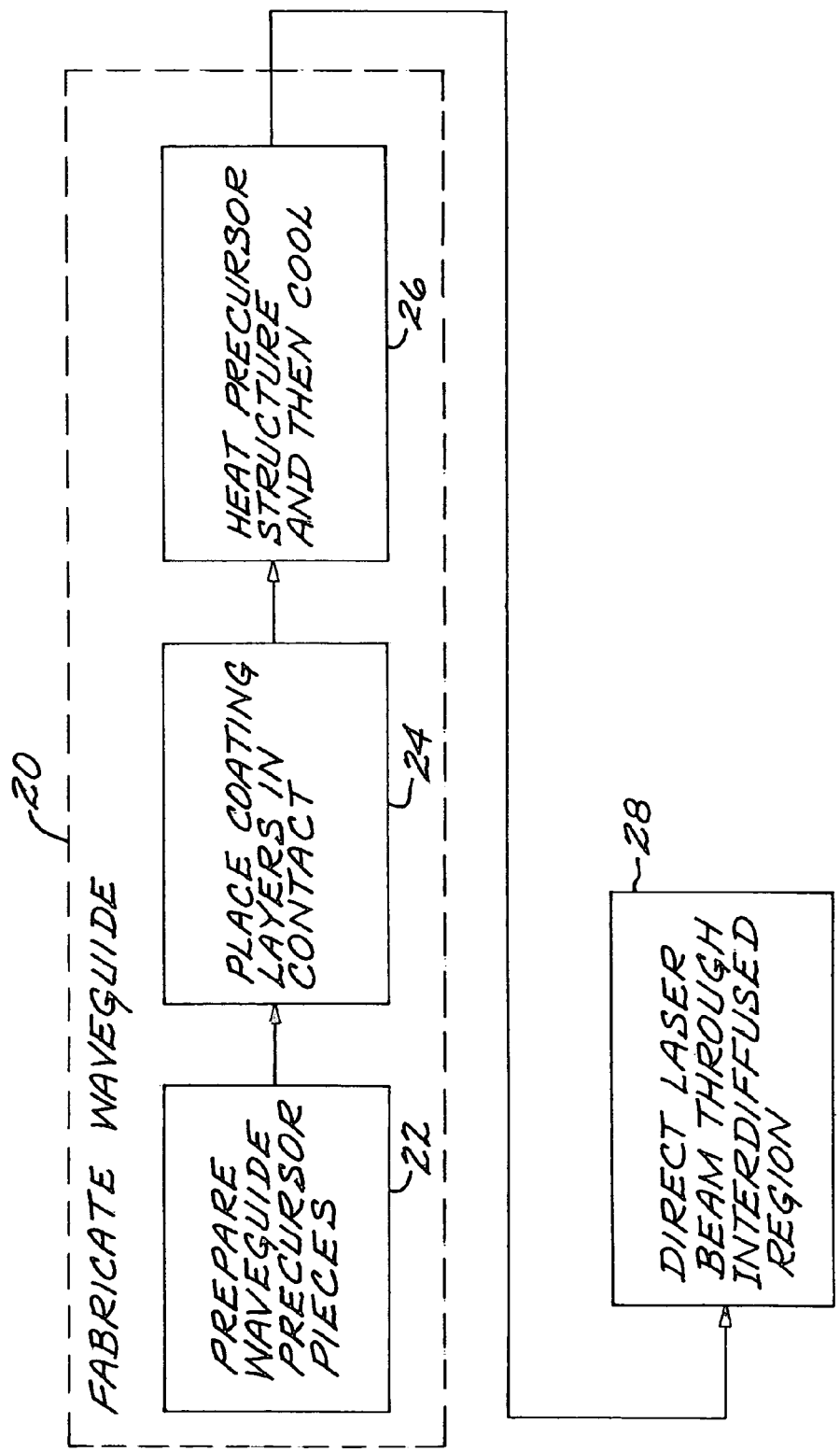
FIG. 1 is a block flow diagram of an embodiment of a method for fabricating and using a light waveguide.

FIG. 1 depicts a method for fabricating and using a waveguide for light. FIG. 2 illustrates the structure at some of the various steps of the method. The waveguide may be used as a waveguide for monochromatic light such as produced by a laser, or with polychromatic light.

Figure 2C:
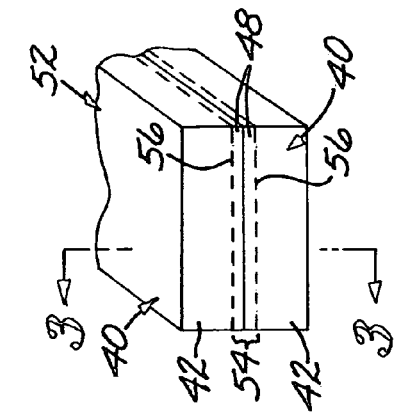
FIGS. 2A–2E are a schematic series of perspective views showing the structure at the various steps of fabricating and using the light waveguide.

The waveguide is first fabricated, step 20. As illustrated in FIG. 2A, two waveguide precursor pieces 40 are first prepared, step 22. Each waveguide precursor piece 40 includes a single-crystal substrate 42 made of an oxide substrate material. If the waveguide is to be used as an optical gain medium, the substrate 42 is selected to be transparent to light of the pumping wavelength. In a preferred application, the oxide substrate material is cubic yttrium aluminum garnet (YAG), having a nominal chemical composition of $Y_3Al_5O_{12}$, but the invention is not so limited Another example of an operable substrate material is gadolinium gallium garnet. Techniques for producing single crystal pieces of cubic yttrium aluminum garnet and gadolinium gallium garnet for other applications are known in the art. The substrate 42 has a coating face 44 with a substrate crystallographic direction 46 lying in the coating face 44. In the preferred application the coating face 44 is a (111) plane and the substrate crystallographic direction 46 is <110>, but the invention is not so limited. The combination of the (111) plane and <110> direction results in reduced depolarization as compared with other combinations, an important benefit. The lateral dimensions of the substrates, D1 and D2, may be of any operable value. However, the present invention finds its greatest utility when at least one of the dimensions D1 or D2 is at least 5 centimeters, preferably at least 10 centimeters, as such large waveguides cannot be made by existing techniques.

The coating face 44 is prepared to be flat and, in the preferred embodiment, planar. The preferred preparation process is polishing to a flatness of better than about $\lambda/10$, or in a typical case less than 10 Angstroms RMS surface roughness. This flat surface promotes bonding in a subsequent step.

An epitaxial coating layer 48 of an oxide coating material is present on the coating face 44 of the substrate 42. The oxide coating material is transparent to the wavelength of the light that is to be transmitted through the waveguide. The oxide substrate material and the oxide coating material are of different compositions, but preferably have the same crystal structure. In the preferred application, the oxide coating material comprises a coating-material cation that is a rare earth selected from the group consisting of ytterbium, thulium, erbium, and holmium, but the invention is not so limited. For example, the oxide coating material may be ytterbium aluminum garnet, having a nominal chemical composition of $Yb_3Al_5O_{12}$; thulium aluminum garnet, having a nominal chemical composition of $Tm_3Al_5O_{12}$; erbium aluminum garnet, having a nominal chemical composition of $Er_3Al_5O_{12}$; or holmium aluminum garnet, having a nominal chemical composition of $Ho_3Al_5O_{12}$, but the invention is not so limited The oxide coating material may be epitaxially deposited by any operable approach, with examples being metal-organic vapor phase epitaxy (MOVPE), liquid phase epitaxy (LPE), pulsed laser deposition (PLD), or ion implantation (II). The preferred deposition approach is MOVPE.

The thickness of the as-deposited epitaxial coating layer 48 is selected to be sufficient to provide sufficient coating-material cation for the interdiffusion accomplished in the subsequently described heating step 26. In a typical case, the epitaxial coating layer 48 has a thickness of from 1 nanometer to 100 micrometers, more preferably from 5 to 10 micrometers, and most preferably 10 micrometers.

Planar specimens of $Y_3Al_5O_{12}$, with the coating face 44 prepared as described above, and coated with $Yb_3Al_5O_{12}$ have been prepared by MOVPE. The as-coated free surfaces of the $Yb_3Al_5O_{12}$ were evaluated and were found to be sufficiently flat and planar to be suitable for the next (contacting) step without further processing.

More generally, an ionic radius of the substrate-material cation and an ionic radius of the coating-material cation should be sufficiently close that the substrate 42 and the epitaxial coating layer 48 have the same crystal structure. In many cases, this selection criterion is satisfied when the ionic radii are within 5 percent of each other, and more preferably within 3 percent of each other. The following are the ionic radii of yttrium (the preferred substrate-material cation) and the above-identified preferred coating-material cations: Y (+3), 1.019 Angstroms; Yb (+3), 0.985 Angstroms; Tm (+3), 0.994 Angstroms; Er (+3), 1.004 Angstroms; and Ho (+3), 1.015 Angstroms. If the difference between the ionic radii is too great, there will not be a strain-free and void-free exchange of the cations in the subsequent diffusion process, and diffusion-related defects will be present in the interdiffused structure and result in a loss of crystal structure. Such crystal structure modification and defects would, if present, interfere with the propagation of light in the completed waveguide.

Optionally during the deposition of the epitaxial coating layer 48, the oxide coating material may be doped with a dopant cation different from and in addition to the coating-material cation (that is, both the dopant cation and the coating-material cation are present). An example of such a dopant cation is gallium. As the gallium diffuses with the coating-material cation into the substrate 42 during the subsequently described heating step, the index of refraction of the interdiffusion region, which forms the core of the waveguide, is increased over what it would otherwise be in the absence of gallium. The result is that the numerical aperture of the interdiffusion region is increased over what it would otherwise be in the absence of gallium.

Figure 2B:
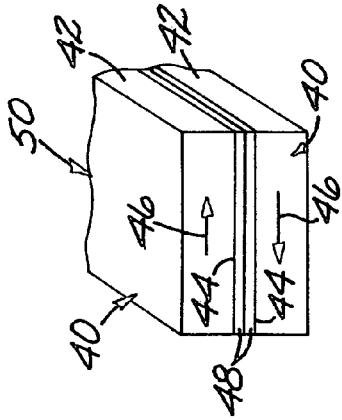
Figure 2E:
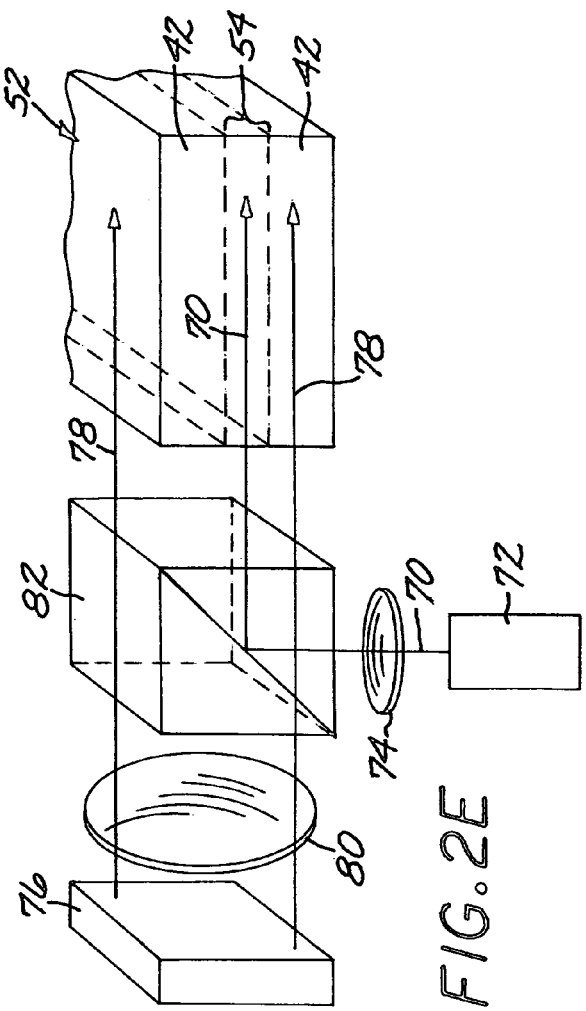
Figure 2A:
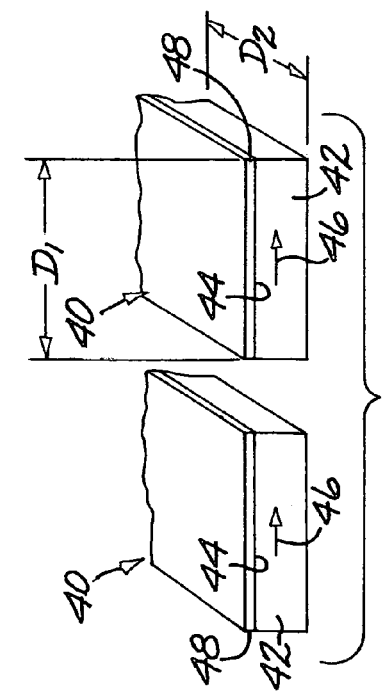

The two coating layers 48 of the two waveguide precursor pieces 40 are placed in contact in a face-to-face manner, step 24 and FIG. 2B. Additionally, the substrate crystallographic directions 46 of the two waveguide precursor pieces 40 are oriented to be parallel. This assembly is termed a precursor structure 50.

Figure 3:
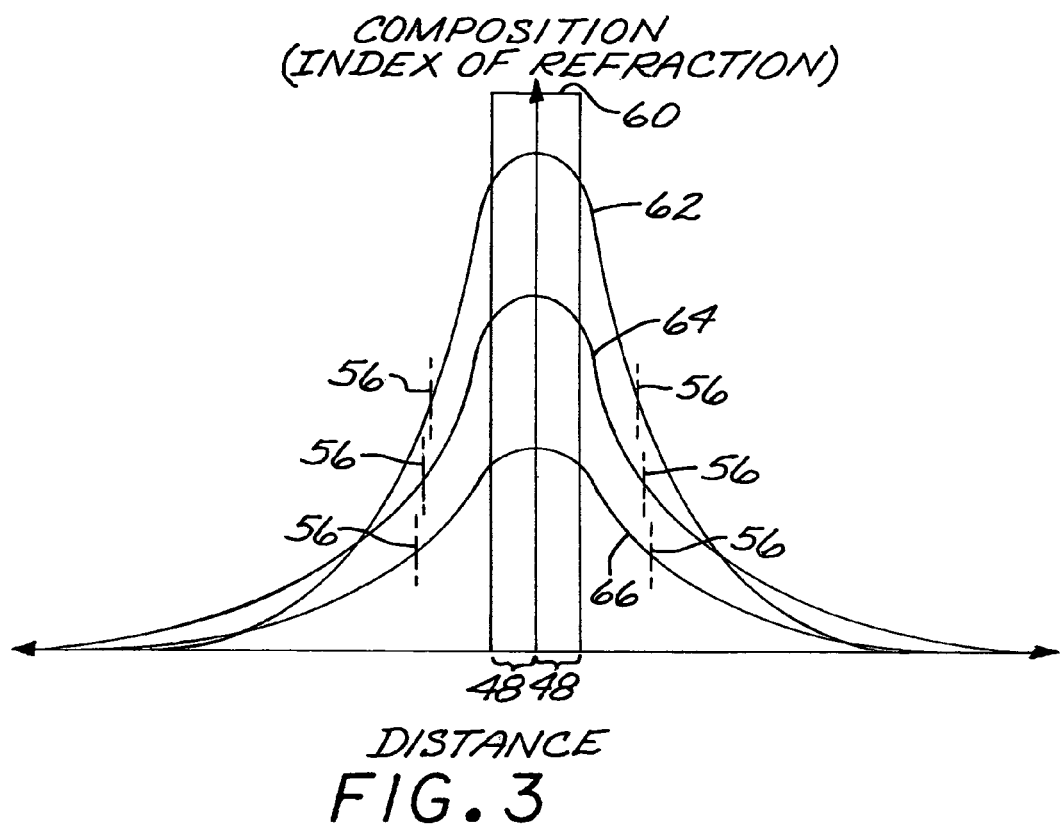
FIG. 3 is a schematic graph of composition as a function of distance, in a transverse section taken along line 3—3 of FIG. 2C.

The precursor structure 50 is heated to an elevated diffusion temperature, optionally with a pressure applied perpendicular to the coating faces 44 of the substrates 42, step 26 and FIG. 2C. For the preferred embodiment, an operable combination of diffusion temperature and time is 1700° C. for a time of days. These values are presented only as examples and not limiting of the invention, because the extent of diffusion will be selected according to the profile of the index of refraction required for a particular application. The coating materials of the coating layers 48, which contact each other, interdiffuse with their respective substrate materials of the substrates 42. The coating layers 48 diffusion bond together to form the waveguide 52 having an interdiffused region 54 with boundaries 56 to the two substrates 42, as illustrated in FIG. 3. As in FIG. 3, the location of the boundaries 56 are typically specified in terms of a Full Width Half Max (FWHM) value. In subsequent use of the waveguide 52 to transmit light, the interdiffused region 54 serves as the core through which the light is transmitted in a channeled fashion. The FWHM value may be used to specify the width of the center core in which the signal beam is propagated. The coating faces 44 of the two substrates 42 have essentially disappeared as a result of being diffused. No adhesive material is used to accomplish the bonding.

In another embodiment, a sequence of temperatures may be used in the heating step 26. For example, a lower temperature may be used to accomplish the initial bonding of the epitaxial coating layers 48 of the two substrates 42, and a higher temperature may be used to achieve the desired degree of interdiffusion.

The positions of the boundaries 56 of the interdiffused region 54 determine the width of the core and thence the width through which light is guided in the final waveguide 52. The position of the boundaries 56 is in turn determined by the extent of diffusion of the coating-material cation from the epitaxial coating layer 48 into the substrate 42 on each side. The extent of diffusion is a function of the structures, and the time and temperature achieved in the heating step 26. FIG. 3 schematically illustrates the spatial distribution of the coating-material cation as a function of the extent of diffusion, and thence as a function of heating temperature and time. Initially prior to heating, the coating-material cation is confined to the epitaxial coating layer 48, curve 60. Curves 62, 64, and 66 depict the distribution of the coating-material cation with successively increasing time at the diffusion temperature during the heating step 26. The FWHM boundaries 56 of the interdiffusion region 54 move further outwardly with increasing interdiffusion. The locations of the boundaries 56 may be predicted using conventional mass diffusion theory, and verified by performing the heating treatments and then measuring the locations of the boundaries 56. Thus, the width of the interdiffusion region 54 may be established precisely by controlling the temperature and time parameters of the heating step 26.

The local index of refraction of the waveguide 52 is a function of the local composition. As shown in FIG. 3, the composition varies continuously as a function of distance for the diffused structures corresponding to curves 62, 64, and 66. The local index of refraction also varies in this manner, producing a graded index of refraction that confines an inserted light beam to the interdiffused region or core 54.

At the completion of the heating step 26, the waveguide 52 is cooled to room temperature. The fabrication of the waveguide 52 is complete.

Figure 4:
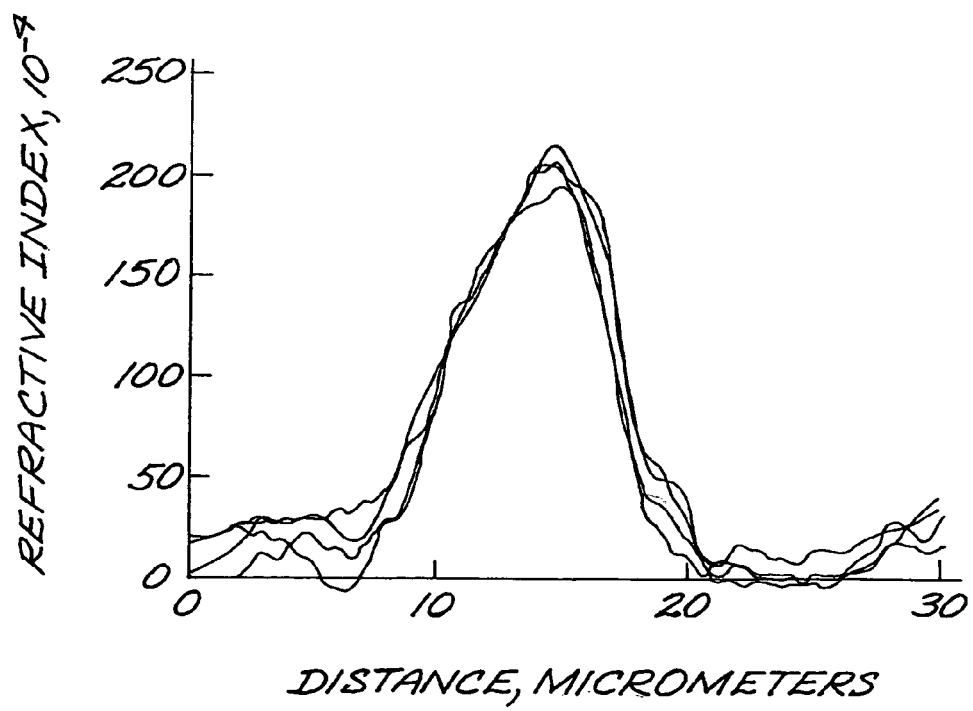
FIG. 4 is a graph of measured index of refraction as a function of distance in a transverse section through a completed waveguide made by the present approach.

The present approach of steps 22, 24, and 26 has been reduced to practice using the fabrication processing discussed above. FIG. 4 is a graph of the measured refractive index as a function of distance through a completed waveguide 52. This waveguide 52 was prepared as discussed above. The FWHM value is about 10 micrometers.

Figure 2D:
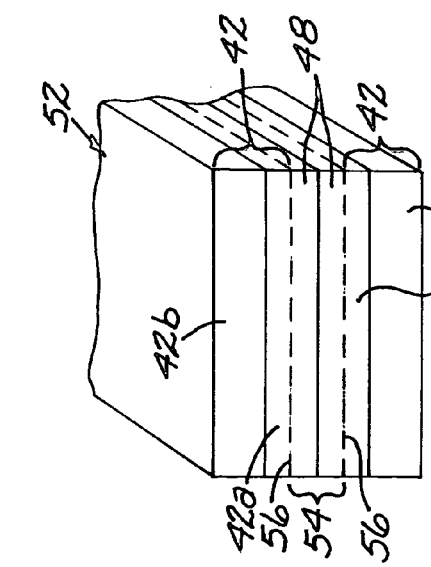

FIG. 2D depicts a variation of the structure of FIG. 2C. The embodiment of FIG. 2D is like that of FIG. 2C, whose disclosure is incorporated, except that the substrate 42 includes an inner cladding layer 42a and an outer cladding layer 42b. The inner cladding layer 42a may be formed by depositing the material for this inner cladding layer 42a onto the outer cladding layer 42b (the inner cladding layer 42a and the outer cladding layer 42b together constituting the substrate 42), prior to depositing the epitaxial coating layer 48 onto the inner cladding layer 42a. Preferably, the inner cladding layer 42a is cubic yttrium aluminum garnet (YAG), as described earlier, and the outer cladding layer 42b may be a lattice-matched material such as spinel ($MgAl_2O_4$). The index of refraction of the outer cladding layer 42b (spinel in the preferred embodiment) is necessarily less than that of the inner cladding layer 42a (cubic yttrium aluminum garnet in the preferred embodiment).

The waveguide 52 is thereafter used. In a preferred application, a laser beam 70 is produced by a laser 72, passed through optics 74 as needed, and injected edgewise into the interdiffused region or core 54 of the waveguide 52, step 28 of FIG. 1 and FIG. 2E (which depicts the use of the waveguide 52 of FIG. 2C). That is, the laser beam 70 is injected through the interdiffused region 54 of the waveguide 52, but not through the substrates 42 of the waveguide 52, except incidentally. Where the waveguide 52 additionally performs as a gain medium, optical pumping energy 78 is injected into one or both of the substrates or cladding 42, from a gain-energy light source 76 such as a laser diode, with appropriate optics 80. In this case, a cube-type polarizing beam combiner 82 is used to accomplish the introduction of the laser beam 70 and the optical pumping energy 78 into the appropriate portions of the waveguide 52. The pumping energy 78 then passes from the cladding 42 into the interdiffused region or core 54, adding gain to the laser beam 70 that is propagated in the interdiffused region or core 54.

In a practical example, the laser beam 70 has a wavelength of from about 1029 nanometers to about 1050 nanometers, with a preferred value of 1030 nanometers. The optical pumping energy 78 has a wavelength of from about 930 nanometers to about 980 nanometers.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating and using a waveguide, comprising the steps of
    preparing two waveguide precursor pieces, each waveguide precursor piece comprising
        a single-crystal substrate made of an oxide substrate material and having a coating face with a substrate crystallographic direction lying in the coating face, and
        an epitaxial coating layer of an oxide coating material on the coating face of the substrate, wherein the oxide substrate material and the oxide coating material are different, wherein the oxide substrate material comprises yttrium as a substrate-material cation and the oxide coating material comprises a coating-material cation selected from the group consisting of ytterbium, thulium, erbium, and holmium;
    placing the two substrates together with their coating layers in contact and with their substrate crystallographic directions parallel, to form a precursor structure; and
    heating the precursor structure to an elevated temperature, so that the coating layers bond together, and the coating materials and the substrate materials interdiffuse to form the waveguide having an interdiffused region, and thereafter cooling the waveguide to room temperature.

2. The method of claim 1, wherein the step of preparing two waveguide precursor pieces includes the step of
    preparing the single-crystal substrate having an inner cladding layer and an outer cladding layer, wherein the inner cladding layer and the outer cladding layer are oxides of different compositions.

3. The method of claim 1, wherein the step of preparing includes the step of
    preparing substantially planar coating faces, so that the interdiffused region is substantially planar.

4. The method of claim 1, wherein the step of preparing includes the step of
    preparing two cubic single-crystal substrates, each with a (111) coating face and a <110> substrate crystallographic direction.

5. The method of claim 1, wherein the step of preparing includes the step of preparing the epitaxial coating layer in a thickness of from about 1 nanometer to about 100 micrometers.

6. The method of claim 1, wherein the step of preparing includes the step of
    preparing the oxide coating material having a dopant cation therein different from and in addition to the coating-material cation.

7. The method of claim 1, wherein the step of preparing includes the step of
    preparing the oxide coating material having a gallium dopant cation therein in addition to the coating-material cation.

8. The method of claim 1, wherein the step of heating includes the step of
    applying a pressure perpendicular to the coating faces of the substrates.

9. The method of claim 1, including an additional step, after the step of heating, of
    directing a laser beam through the interdiffused region of the waveguide but not through the substrates of the waveguide.

10. The method of claim 1, including additional steps, after the step of heating, of
    directing a laser beam through the interdiffused region of the waveguide but not through the substrates of the waveguide, and
    applying optical pumping energy to the interdiffused region of the waveguide through at least one of the substrates of the waveguide.

* * * * *